(12) United States Patent
Babcock et al.

(10) Patent No.: US 7,808,892 B1
(45) Date of Patent: Oct. 5, 2010

(54) REDUNDANT DATA DISTRIBUTION SYSTEMS AND METHODS

(75) Inventors: Jess D. Babcock, Shoreline, WA (US); Peter D. Donich, Houston, TX (US)

(73) Assignee: MeteorComm, LLC, Kent, WA (US)

( * ) Notice: Subject to any disclaimer, the term of this patent is extended or adjusted under 35 U.S.C. 154(b) by 214 days.

(21) Appl. No.: 11/975,939

(22) Filed: Oct. 22, 2007

Related U.S. Application Data

(60) Provisional application No. 60/860,406, filed on Nov. 21, 2006.

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)

(52) U.S. Cl. .................. 370/219; 370/217; 370/218; 370/220; 370/221

(58) Field of Classification Search ......... 370/219–220, 370/217, 225, 335; 379/221, 269; 709/239, 709/245
See application file for complete search history.

(56) References Cited

U.S. PATENT DOCUMENTS

| | | | | |
|---|---|---|---|---|
| 5,974,114 A | * | 10/1999 | Blum et al. | 379/9 |
| 6,487,605 B1 | * | 11/2002 | Leung | 709/245 |
| 2002/0133746 A1 | * | 9/2002 | Chen et al. | 714/13 |
| 2006/0159011 A1 | * | 7/2006 | Dalal et al. | 370/220 |
| 2007/0206542 A1 | * | 9/2007 | Proctor, Jr. | 370/335 |

* cited by examiner

Primary Examiner—Ricky Ngo
Assistant Examiner—David Oveissi
(74) Attorney, Agent, or Firm—Thompson & Knight LLP; James J. Murphy

(57) ABSTRACT

A communications system includes a plurality of operational nodes and a plurality of data distribution systems. A data distribution system operating in an active mode manages exchanges of data between the operational nodes and further operable to periodically transmit go passive messages commanding at least one other of the data distribution systems to operate in a passive mode. A data distribution system operating in the passive mode waits for receipt of one of the go passive messages, continues to operate in the passive mode after receiving one of the go passive messages within a predetermined time out period, and transitions to the active mode after the time out period has expired without receipt of one of the go passive messages.

16 Claims, 4 Drawing Sheets

REDUNDANT DATA DISTRIBUTION SYSTEMS AND METHODS

CROSS-REFERENCE TO RELATED APPLICATION

The present application claims the benefit of U.S. Provisional Patent Application Ser. No. 60/860,406, filed Nov. 21, 2006.

FIELD OF INVENTION

The present invention relates in general to network communications, and in particular, to redundant data distribution systems and methods.

BACKGROUND OF INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In reliability-critical communications systems, a failure of any link within a given communications path must be detected and quickly addressed. In the case of a railroad communications system, this must include detecting and addressing any failures occurring within the wired network between the railroad central office and each of the radio base stations.

SUMMARY OF INVENTION

The principles of the present invention are embodied reliability-critical communications systems and methods for operating such communications systems. In one representative embodiment, a communications system is disclosed that includes a plurality of operational nodes and a plurality of data distribution systems. A data distribution system operating in an active mode manages exchanges of data between at least some of the operational nodes and additionally periodically transmits messages commanding at least one other data distribution system to operate in a passive mode. A data distribution system in the passive mode continues to operate in the passive mode as long as messages continue to be received from the active mode data distribution system within a predetermined time out period; otherwise, the passive mode data distribution system transitions to the active mode after the time out period expires.

Embodiments of the present principles advantageously provide improved reliability through system redundancy, with or without an arbitrator or similar control system. In reliability critical applications, such as communications networks used in the transportation industries, the inventive principles ensure that data flow between remote base stations and a central office are maintained in view of a failure a data distribution node within the network.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
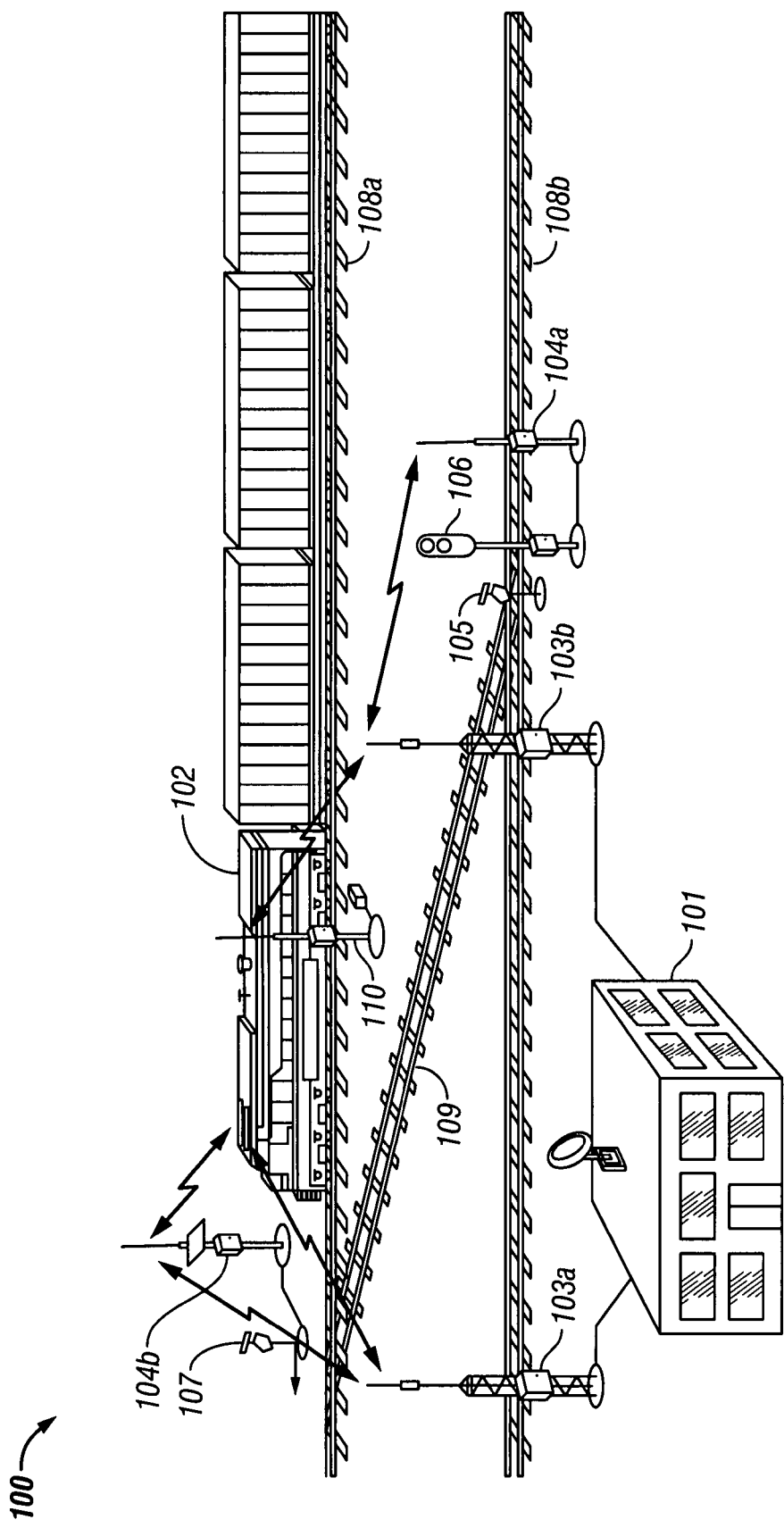
FIG. 1 is a high level block diagram of a small portion of a representative communications system utilized in the railroad industry and suitable for describing a typical application of the present inventive principles.
Figure 2:
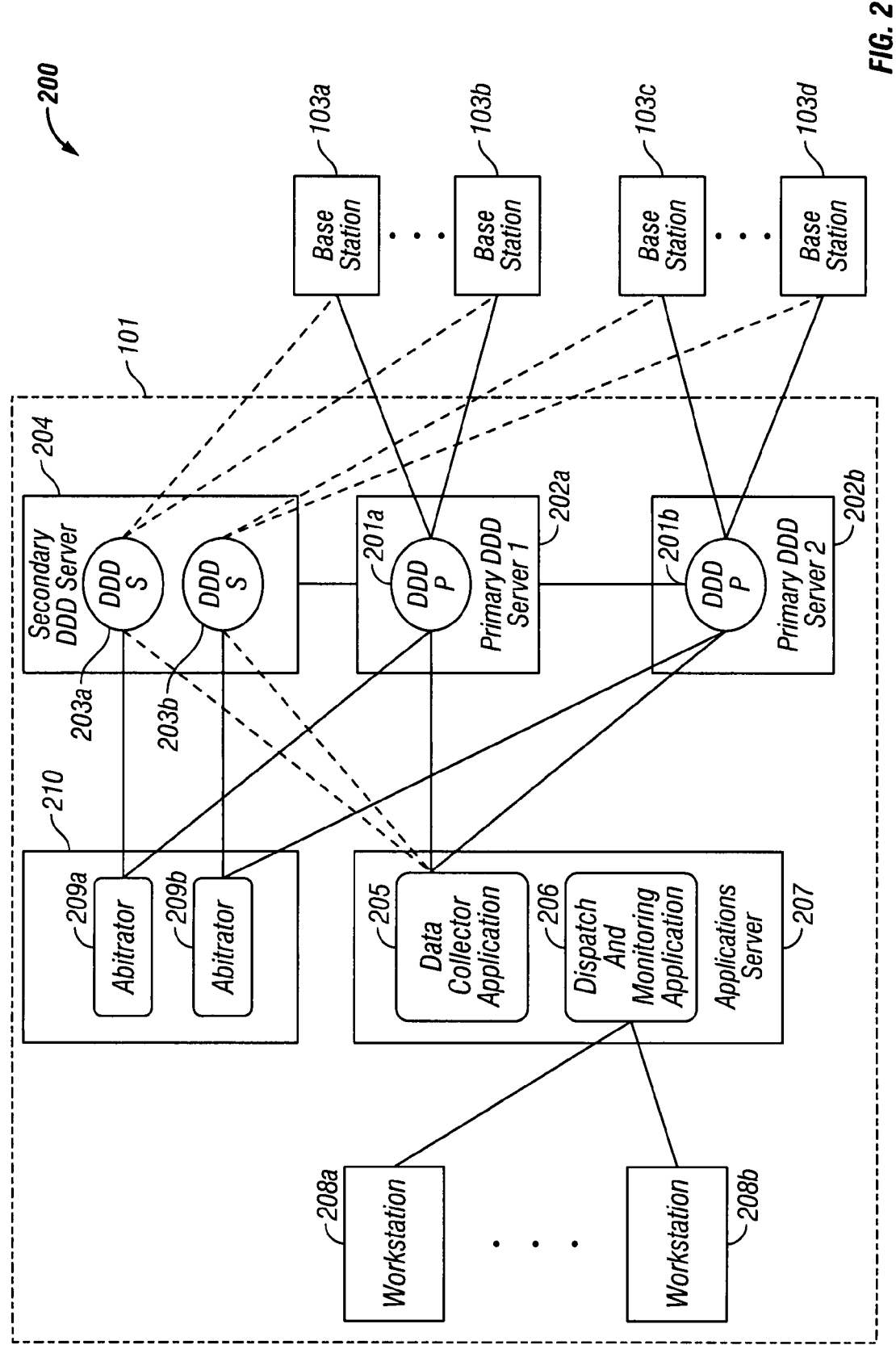
FIG. 2 is a block diagram of an exemplary data processing network suitable for describing a typical application of the present inventive principles.
Figure 3:
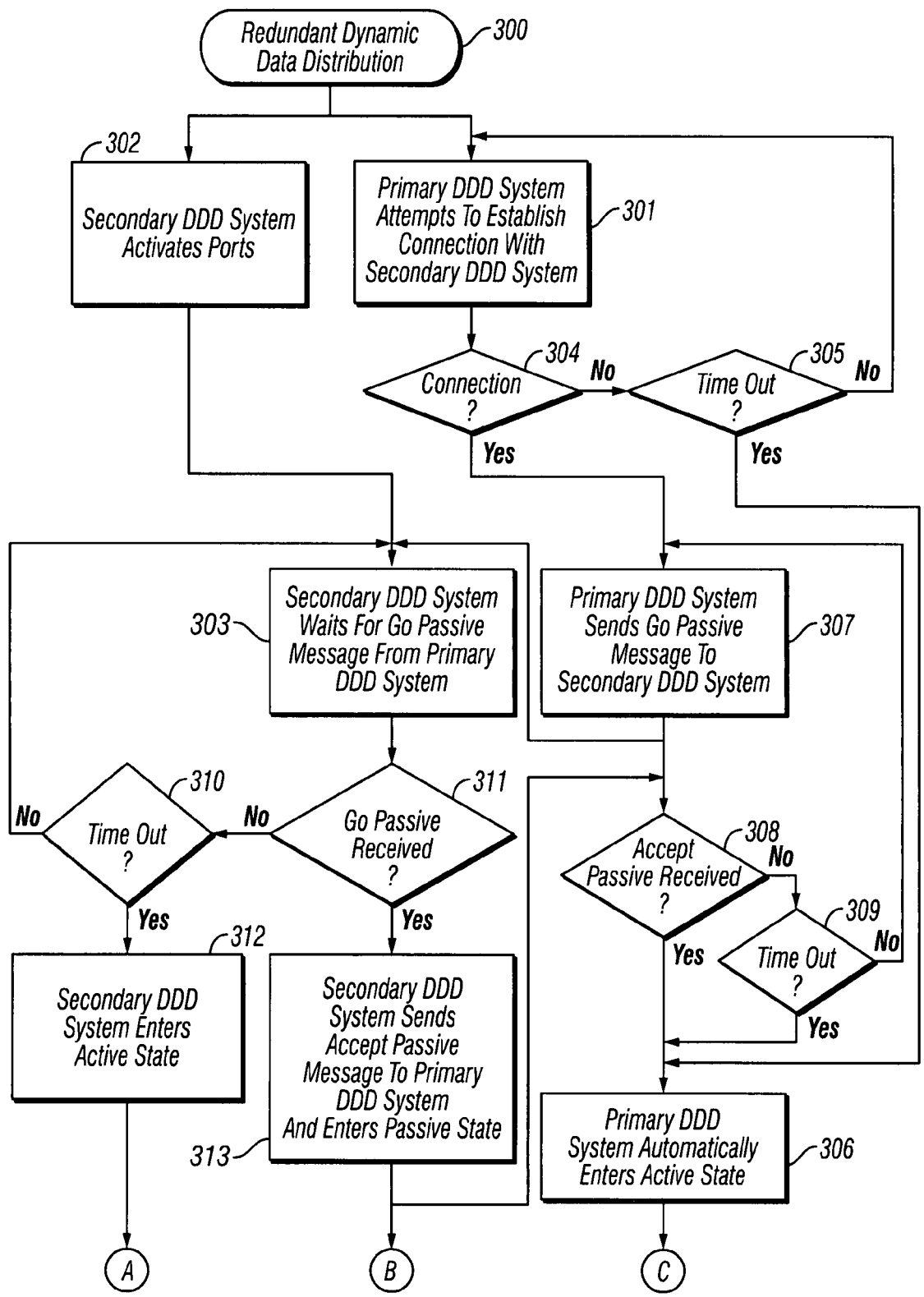
FIG. 3 is a flow chart of a representative method of operating a communication system, such as that shown in FIG. 2, according to the principles of the present invention.
Figure 3:
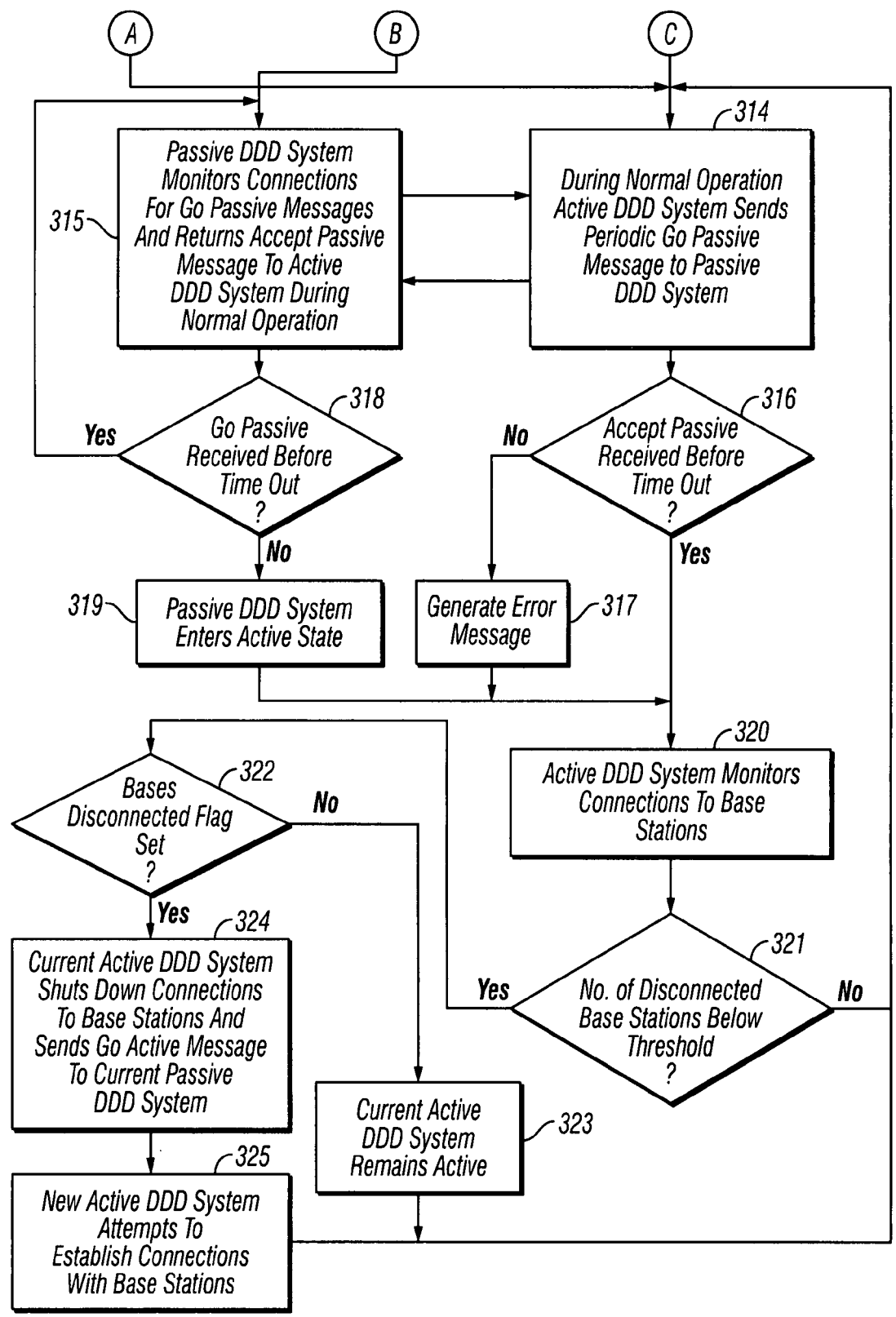

The principles of the present invention and their advantages are best understood by referring to the illustrated embodiment depicted in FIGS. 1-3 of the drawings, in which like numbers designate like parts.

FIG. 1 is high level diagram showing a small portion of a railroad communications system 100 embodying the principles of the present invention. Generally, system 100 supports wireless communications between a central office (network operating center) 101 and locomotives 102 located at various points around a rail system, as well as direct communications between locomotives 102 and the electronic wayside monitoring subsystems, discussed below in detail.

In communications system 100, central office 101 communicates with packet radios on locomotives 102 through a wired telecommunications network and a series of packet radio base stations dispersed over thousands of square miles of geographical area through which the rail system operates. In the diagram of FIG. 1, two radio base stations 103a and 103b are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101 though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a three-lamp signal 106, and wayside monitoring subsystem 104b is shown monitoring a hand-throw switch 109. Also for illustrative purposes, two parallel sections of track 108a and 108b and a connecting section 109 are shown in FIG. 1, which represent only a very small part of the overall track system.

Communications system 100 also includes a hotbox monitoring subsystem 110 which uses rail-side sensors to allow central office 101 to monitor the axle status of passing trains through packet data radios and wireless base stations 103. In particular, railcar wheels, brakes, and trucks can be monitored for stuck brakes or overheated bearings, such that trains can be slowed or stopped before a catastrophic failure occurs.

FIG. 2 is a high level block diagram of a data network 200 suitable for describing the principles of the present invention. Data network 200 supports, for example, wired networked communications between central office 101 and base stations 103 shown in FIG. 1.

In the illustrated embodiment of FIG. 2, two sets of two radio base stations 103a-103b and 103c-103d are shown, which represent the much larger number of radio base stations typically found in a railroad communications system. As discussed further below, a number of software applications and servers are shown in FIG. 2 for illustrative purposes; however, in actual applications, the number and type of software applications and servers may vary. For example, various software applications may be consolidated into fewer servers or additional intervening servers and software applications may be provided in the network as required to efficiently control the routing of data.

In FIG. 2, radio base stations 103a-103b communicate through a primary dynamic data distribution (DDD) software system 201a operating on primary server 202a and radio base stations 103c-103d communicate through primary DDD software system 201b operating on primary server 202b. Radio base stations 103a-103b also communicate with a secondary DDD software system 203a, while radio base stations 103c-103d communicate with a secondary DDD software system 203b. In the illustrated embodiment, secondary DDD software systems 203a-203b are running on secondary server 204.

Data distributed by primary DDD software systems 201a-201b and secondary DDD software systems 203a-203b are processed by data collector software application 205, which operates in conjunction with, for example, railroad dispatch and monitoring software application 206. In the exemplary system of FIG. 2, data collector software application 205 and dispatch and monitoring software 206 are running on a server 207, which in turn supports a set of workstations, including workstations 208a and 208b.

In the present example, a pair of software arbitrators 209a and 209b are shown running on an additional server 210. Arbitrators 209a and 209b, which are utilized in some embodiments of the present invention, are discussed in further detail below.

Primary and secondary DDD software systems 201 and 203, when activated, control bidirectional message exchanges between radio base stations 103 and the applications programs running on applications server 207 using the TCI/IP protocol. Active DDD software systems 201 and 203 also track which locomotives 102 are reporting through which radio base stations, such that messages from central office 101 locomotives 102 can be efficiently routed.

Generally, primary and secondary DDD software systems 201 and 203 analyze the data packets being routed between radio base stations 103 and data collector application 205 to determine packet type and routing information. Packets that contain specific routing information are routed towards the defined destination or destinations. Default (source) routing is implemented by analyzing the source routing information for the originating node and then routing the packets to the associated destination or destinations. In either case, primary and secondary DDD software systems 201 and 203 are responsible for message delivery and therefore retain and resend packets until either the message is delivered or a Time-to-Live setting for the message expires. (For source routed packets, the given DDD software system 201 or 203 sends a transport level End-to-End Acknowledgement (ETE) to the source node when it accepts a message for delivery, thus taking responsibility for delivering that message to the destination node. For directly addressed packets, the destination node takes responsibility for sending the ETE, which is then forwarded by the intervening DDD software system 201 or 203 to the originating node.)

DDD software systems 201 and 203 can also establish virtual connections data collector application 205 on server 207 and base stations 103. In this case, DDD software systems 201 and 203 pass all packets through without taking responsibility for message delivery. For example, during the transmission of messages from one or more base stations 103 to server 207, the given DDD software system simply passes-through the ETEs. In response to the ETEs, the application managing the transaction retains and resends packets until messages are complete or the corresponding Time-to-Live period expires for a given messages or messages.

The principles of the present invention advantageously provide for redundant packet routing using primary and secondary DDD software systems 201 and 203. This redundancy may be implemented with or without arbitrators 209a-209b, depending on the particular system embodiment.

In embodiments that do not utilize an arbitrator, pairs of primary and secondary DDD software systems communicate directly to ensure that one DDD system of the pair is active and fully functional. In the present example, DDD systems 201a and 201b are arbitrarily designated as the primary DDD systems and DDD systems 203a and 203b as the secondary DDD systems by INI software files. Primary DDD systems 201a and 201b then each establish two (2) communications connections with respective secondary DDD systems 203a and 203b to pass heartbeat information. Preferably, secondary DDD systems 203a and 203b are configured with two additional host sockets to accept these connections. Four heartbeat messages are then defined as follows:

Go Active
Go Passive
Accept Active
Accept Passive

Generally, when any DDD system 201 or 203 receives either a Go Active or Go Passive message, it responds with the appropriate Accept Active or Accept Passive message and then switches to the specified mode. (However, when a primary DDD system 201 is starting up, it will ignore any Go Passive messages received from a secondary DDD system 203 and resumes operating as the Active DDD of the pair.)

FIG. 3 is a flow diagram of a redundant dynamic data distribution procedure 300 according to the inventive principles. (Assume for discussion purposes, that procedure 300 is being implemented by primary DDD system 201a and secondary DDD system 203a although procedure 300 is equally applicable to any designated pair of primary and secondary DDD systems 201 and 203.)

At block 301, primary DDD system 201a attempts on start-up to establish heartbeat connections with secondary DDD system 203b. At the same time, secondary DDD system 203a activates its heartbeat ports, at Block 302, and waits for a Go Passive message from primary DDD system 201a at Block 303.

If primary DDD system 201a fails to establish heartbeat connections to secondary DDD system 203a, it retries establishing those connections at Decision Block 304 until a predetermined startup heartbeat timeout interval has expired at Block 305, after which primary DDD system 201a automatically jumps to Block 306 and enters the Active state.

If primary DDD system 201a successfully establishes connections with secondary DDD system 203a, then primary DDD system 201a sends a Go Passive message to secondary DDD system 203a at Block 307 (in case DDD system 203a was currently in the Active mode) and waits for responsive Accept Passive message. If primary DDD system 201a receives an Accept Passive message before time-out of the startup heartbeat timeout interval at Decision Blocks 308 and 309, then primary DDD system 201a enters the Active state at Block 306. Otherwise, if the startup heartbeat timeout interval expires at Decision Block 309, primary DDD system 201a jumps automatically to Block 306 and enters the Active state.

On the other hand, if, during monitoring at Block 303, secondary DDD system 203a does not receive a Go Passive message on at least one of its heartbeat ports before the startup heartbeat timeout interval expires (Blocks 310 and 311), secondary DDD system 203a automatically enters the Active state (Block 312). Otherwise, secondary DDD sends the Accept Passive message discussed above at Block 313 and enters the passive state.

At Block 314, the current Active DDD system 201a or 203a continues to send a Go Passive heartbeat message out of its heartbeat connections every one half of the heartbeat timeout interval. At the same time, at Block 315, the current Passive DDD system 201a or 203b monitors its ports for Go Passive messages and returns responsive Accept Passive messages to the current Active DDD system.

If the current active DDD system 201a or 203a does not receive an Accept Passive message within the heartbeat timeout interval (Block 316), it displays a warning icon and sends an Email notification to one or more workstations 208 (Block 317). A similar warning and Email notification are issued when the Active DDD system detects the loss of any configured heartbeat connections. Otherwise, if the current Passive DDD system 201a or 203a does not receive a Go Passive heartbeat message within the heartbeat timeout interval at Block 318, then that Passive DDD system switches to the Active state at Block 319.

The DDD system 201a or 203a in Active state at Block 320 establishes and then monitors the connection to the associated radio base stations 103 (in this example, radio base stations 103a and 103b). Each base connection can be in one of three states: Connected, Disconnected, or Connecting. In particular, each base connection starts off in the Connecting state. If the current Active DDD system 201a or 203a fails to connect with a given base station 103a-103b twice in a row, that base station 103a-103b is set to the Disconnected state. On the other hand, when the current Active DDD system connects to a given base station 103a-103b, that base connection is set to the Connected state. Finally, if a base connection between the current Active DDD system 201a or 203a and a base station 103a-103b is lost, that connection returns to the Connecting state and the Active DDD system attempts to re-establish the base connection.

The INI files for primary and secondary DDD systems 201 and 203 define a threshold percentage of allowable base stations 103 which may be in the Disconnected state. If the percentage of Disconnected bases stations 103 for the currently Active DDD system 201 or 203 of each pair exceeds this threshold, and the currently Active DDD system is maintaining a good heartbeat connection to the current Passive DDD system, then the currently Active DDD will shutdown its base station connections and send a Go Active message to the currently Passive DDD system. The new Active DDD system then establishes connections with the corresponding base stations 103.

To prevent a pair of primary and secondary DDD systems 201 and 203 from swapping back and forth between Active and Passive states when both have lost their connections to the corresponding base stations 103, a Bases Disconnected flag is provided in the Primary DDD system 201 of the pair. The Bases Disconnected flag is initially cleared, and then is set when the percentage of Disconnected base stations 103 associated with the primary DDD system 201 exceeds the disconnected threshold value. This flag is cleared whenever the percentage of associated Connected base stations 103 exceeds the disconnected threshold value. If the flag is already set when the percentage of Disconnected bases exceeds the threshold value, then the current Active DDD does not switch.

In the current example, the Active DDD system 201a or 203a monitors the connections to base stations 103a-103b at Block 320 and a determination is made as to whether the threshold is exceeded at Block 321. If the Bases Disconnected flag is set at Decision Block 322, then the current Active DDD system 201a or 203b remains active at Block 323. If the threshold has been exceeded and the Bases Disconnected flag is not set (i.e. is cleared) at Block 322, then the current Active DDD system 201a or 203a remains the Active DDD system. Otherwise, at Block 324 the current Active DDD system 201a or 203a shuts down its radio base station connections and sends a Go Active message to Passive DDD system of the pair. The new Active DDD system 201a or 203a then attempts to establish connections with base stations 103a-103b (Block 325).

In addition, a Switch Redundant Mode option added to the Configuration menu provided on workstations 208a-208b. In the illustrated embodiment, this menu pops up a dialog box showing the current state of each DDD system 201 or 203 and verifying that the operator wants to switch the state of a given DDD system 201 or 203. This feature allows the operator to manually select the Active DDD system and the Passive DDD system for a given pair (e.g. in order to update hardware/software on the currently Active DDD server).

In some embodiments, Email messages may also be sent to workstations 208a-208b in response to the change in status of a given primary DDD system 201 or secondary DDD system 203. Exemplary Email messages include:

1. Switching from Passive to Active because of timeout waiting for Go Passive Message;
2. Switching from Passive to Active because of receiving a Go Active Message;
3. Switching from Active to Passive because of receiving a Go Passive Message;
4. Switching from Active to Passive because of disconnected base stations;
5. Percentage of disconnected base stations exceeded, but staying Active due to Bases Disconnected flag set (both primary and secondary DDDs cannot connect to base stations);
6. Percentage of disconnected bases below threshold (clearing of previous state);
7. Timeout waiting for Go Passive/Passive Accepted message on a heartbeat connection; and
8. Heartbeat connection restored.

As indicated above, the principles of the present invention may also be applied in systems utilizing one or more arbitrators, such as arbitrators 209a and 209b shown in FIG. 2. In the illustrative embodiment shown in FIG. 2, arbitrators 209a and 209b send out Heartbeat (HB) commands to corresponding primary DDD systems 201a and 201b and secondary DDD systems 203a and 203b. In this example, the two HB commands are HB, ACTIVE or HB, PASSIVE.

When a DDD system 201 or 203 receives a HB command from the corresponding arbitrator 209a or 209b, a heartbeat accept message is sent back, which is available to all connected applications (except base stations 103). The accept messages are either: HB, ACCEPT, ACTIVE or HB, ACCEPT, PASSIVE DDD systems 201 and 203 also send out an accept message when a connection is first initiated. This allows a connecting application (e.g. running on applications server 207) to quickly ascertain the status of the DDD system 201 or 203 without having to wait for a HB command to arrive from arbitrator 209a-209b (which could conceivably be a long time if that DDD system has lost its connection to the associated arbitrator). If more than 30 seconds pass without the DDD system 201 or 203 receiving a HB command, the connection corresponding arbitrator 209a-209b is assured to be lost (changes to an error icon on the associated workstation), and that DDD system 201 or 203 automatically enters passive mode.

DDD systems 201 and 203 provide to all connected applications running on applications server 207 either a Passive or a Active Heartbeat Message depending on the state defined by the DDD arbitrator 209a or 209b. Generally, according to the principles of the present invention, the applications are always connected to both the primary and secondary DDDs and are able to respond appropriately to the DDD heartbeat (this includes applications that receive packets from DDD systems 201 and 203 and send and receive packets from DDD systems 201 and 203.)

Packets or messages might be interrupted during DDD switch-over. These packets or messages can be assumed lost, and the applications tasked with accounting with the lost data. Alternatively, the host application can retain message identifiers waiting for an ETE to be received; if an ETE is not received, the host application retransmits the message.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A method of operating a communications system comprising:
    periodically sending go passive messages from a current active data distribution system managing the exchange of data with selected nodes of the communications system to a current passive data distribution system, the go passive message commanding the current passive data distribution system to remain in a passive mode;
    in response to receiving each of the go passive messages at the current passive data distribution system, maintaining the current passive data distribution system in the passive mode and returning an accept passive message to the current active data distribution system;
    if the current active data distribution system fails to send one of the go passive messages to the current passive data distribution system within a predetermined time period, setting the current passive data distribution system into the active mode for managing the exchange of data with the selected nodes of the distribution system; and
    monitoring with the current active data distribution system connections at least some of the selected nodes of the communications system and activating the current passive data distribution system, comprising:
        determining that a number of connections between the selected nodes and the current active data distribution system has fallen below a predetermined threshold;
        sending a go active command from the current active data distribution system to the current passive data distribution system commanding the current passive data distribution system to enter the active mode; and
        establishing connections between the selected nodes and the new active data distribution system.

2. The method of claim 1, further comprising:
    at start up, designating a primary data distribution system and a secondary data distribution system;
    attempting to establish a connection between the primary and secondary data distribution systems;
    when the connection is established, sending a go passive message from the primary data distribution system to the secondary distribution system commanding the secondary distribution system to enter the passive mode;
    waiting for receipt by the primary data distribution system of an accept passive message from the secondary data distribution system acknowledging the go passive message;
    setting the primary data distribution system into the active mode when the accept passive message is received; and
    setting the primary data distribution system into the active mode after a predetermined time period has expired without receipt of the accept passive message.

3. The method of claim 1, further comprising:
    at start up, designating a primary data distribution system and a secondary data distribution system;
    waiting for receipt by the secondary data distribution system of a go passive message from the primary data distribution system commanding the secondary data distribution system to enter the passive mode;
    setting the secondary data distribution system into the passive mode and sending an accept passive message to the primary data distribution system when the go passive message is received by the secondary data distribution system; and
    setting the secondary data distribution system Into the active mode after a predetermine time period has expired without receipt of the go passive message.

4. The method of claim 1, wherein the selected nodes of the communications system include radio base stations.

5. The method of claim 4, wherein the active data distribution systems manages exchanges of data between the radio base stations and an application program running on a server.

6. A communications system comprising:
    a plurality of operational nodes;
    a plurality data distribution systems, each data distribution system while in an active mode managing exchanges of data between the operational nodes, wherein:
        each data distribution system is operable in the active mode to:
            periodically transmit go passive massages commanding at least one other of the data distribution systems to operate in a passive mode;
            monitor connections with selected ones of the operational nodes;
            determine when a number of connections with the selected ones of the operational nodes has fallen below a predetermined threshold; and
            in response to determining that the number of connections with the selected ones of the operational nodes has fallen below the predetermined threshold, send a go active message commanding another one of the data distribution systems to transition from the passive mode to the active mode; and
        each data distribution system is operable in the passive mode to:
            wait for receipt of one of the go passive messages;

continue to operate in the passive mode after receiving one of the go passive messages within a predetermined time out period; and transition to the active mode after the time out period has expired without receipt of one of the go passive messages.

7. The communications system of claim 6, wherein each data distribution system is operable in the passive mode to transmit an accept passive message in response to receipt of one of the go passive messages.

8. The communications system of claim 6, wherein the selected ones of the operational nodes comprise radio base stations.

9. The communications system of claim 6, wherein a selected one of the data distribution systems is a primary data distribution system and another selected one of the data distribution systems is a secondary data distribution system, wherein:

at start up, the primary data distribution system is operable to:

attempt to establish a connection with the secondary data distribution system;

when the connection is established, send a go passive message to the secondary distribution system commanding the secondary distribution system to enter the passive mode;

wait for receipt of an accept passive message from the secondary data distribution system acknowledging the go passive message;

transition into the active mode when the accept passive message is received; and transition into the active mode after a predetermined time period has expired without receipt of the accept passive message.

10. The communications system of claim 9, wherein a selected one of the data distribution systems is a primary data distribution system and another selected one of the data distribution systems is a secondary data distribution system, wherein:

at start up, the secondary data distribution system is operable to:

wait for receipt of a start up go passive message from the primary data distribution system commanding the secondary data distribution system to enter the passive mode;

enter the passive mode and send a start up, accept passive message to the primary data distribution system when the go passive message is received; and enter the active mode after a predetermine time period has expired without receipt of a go passive message from the primary data distribution system.

11. The communications system of claim 6, wherein each data distribution system is operable to enter the passive mode in response to a user generated command.

12. The communications system of claim 6, wherein at least one of the operational nodes comprises a server running applications software and at least one of the operational nodes comprises a radio base station.

13. A method of operating a communications system including a plurality of operational nodes and a plurality of data distribution systems each operable in an active mode to manage exchanges of data between the operational nodes, comprising:

periodically transmitting from a controlling system messages commanding a selected data distribution system to operate in a passive mode;

operating the selected data distribution system in the passive mode as long as one of the messages is received by the selected data distribution system within a time out period;

transitioning the selected data distribution system from the passive mode to an active mode when the time out period has expired without receipt by the selected data distribution system of one of the messages;

monitoring a number of connections between the radio base stations and a currently active one of the data distribution systems; and activating the selected data distribution system operating in the passive mode when the connections between the current active data distribution system and the radio base stations falls below a selected threshold.

14. The method of claim 13, wherein the controlling system comprises a selected data distribution system operating in an active mode.

15. The method of claim 13, wherein the controlling system comprises an arbitrator.

16. The method of claim 13, wherein the operational nodes include a set of radio base stations and at least one server and the data distribution systems are operable in the active mode to manage exchanges between the radio base stations and the at least one server.

* * * * *